United States Patent [19]

Tanaka et al.

[11] Patent Number: 5,545,249

[45] Date of Patent: Aug. 13, 1996

[54] SINTERED BEARING ALLOY FOR HIGH-TEMPERATURE APPLICATION AND METHOD OF MANUFACTURING AN ARTICLE OF THE ALLOY

[75] Inventors: Tadashi Tanaka; Masaaki Sakamoto; Koichi Yamamoto; Kouki Ozaki, all of Nagoya, Japan

[73] Assignee: Daido Metal Company Ltd., Nagoya, Japan

[21] Appl. No.: 431,036

[22] Filed: Apr. 28, 1995

[30] Foreign Application Priority Data

Apr. 30, 1994 [JP] Japan .................................. 6-113504

[51] Int. Cl.⁶ .................................. B22F 3/12; B22F 5/00; B22F 7/04
[52] U.S. Cl. .................................. 75/246; 75/230; 419/6; 419/14; 419/38; 428/552
[58] Field of Search .................................. 428/552; 419/6, 419/14, 38; 75/230, 246

[56] References Cited

U.S. PATENT DOCUMENTS

| | | | |
|---|---|---|---|
| 4,853,182 | 8/1989 | Cornie et al. | 420/129 |
| 4,927,461 | 5/1990 | Ciloglu et al. | 75/254 |
| 5,045,512 | 9/1991 | Lange et al. | 501/96 |
| 5,332,422 | 7/1994 | Rao | 75/252 |

FOREIGN PATENT DOCUMENTS

| | | |
|---|---|---|
| 54-128923 | 5/1979 | Japan . |
| 60-221557 | 11/1984 | Japan . |
| 56-77360 | 11/1988 | Japan . |
| 63-93842 | 3/1994 | Japan . |
| 2248850 | 4/1992 | United Kingdom . |

*Primary Examiner*—Charles T. Jordan
*Assistant Examiner*—Daniel Jenkins
*Attorney, Agent, or Firm*—Browdy and Neimark

[57] ABSTRACT

A sintered bearing alloy for high-temperature application containing from more than 5 to 10 weight percent h-BN particles having a size of 100 to 500 μm, which are dispersed in the matrix of stainless steel. Granulated h-BN powder is mixed with austenitic stainless steel powder and the resultant blended powder is formed into a green compact by compression, after which the green compact is sintered.

7 Claims, 1 Drawing Sheet

SINTERED BEARING ALLOY FOR HIGH-TEMPERATURE APPLICATION AND METHOD OF MANUFACTURING AN ARTICLE OF THE ALLOY

BACKGROUND OF THE INVENTION

1. Field of the Invention

The present invention relates to a bearing alloy used at high temperature, and a method of manufacturing an article made of the alloy.

2. Technical Background

Bearings disclosed in JP-A-60-221557 and JP-A-54-128923 have been conventionally known as bearings for high-temperature application. The bearing disclosed in JP-A-60-221557 is formed of a sintered alloy obtained by sintering a blended powder consisting of 0.2 to 20% alloy, 0 to 2% graphite, and the residual part of austenitic stainless steel powders, the alloy consisting of at least one of Co and Ni as a base component, 25 to 40% Mo, 2 to 10% Si, and 0 to 20% Cr. The bearing alloy is excellent in wear resistance and oxidation resistance at a high temperature of 300° to 900° C. As hard particles, intermetallic compounds of Hv 700 to 1100 and carbides of Hv 1100 to 1500 are dispersed in the bearing alloy, so that suitable hardness of these hard particles improves wear resistance of the bearing.

Disclosed in JP-A-54-128923 is a sintered alloy in which 1.5 to 5.0% h-BN (hexagonal boric nitride) by weight is dispersed in stainless steel. This alloy is a sliding material which is excellent in wear resistance and oxidation resistance at a high temperature of 400° to 600° C. Also, highly lubricative BN serves to provide high lubricity without damaging a mating material.

Of the above-described bearings of the prior art, however, the former is liable to attack or damage the mating material because the wear resistance is obtained from the hard particles in the bearing alloy. This bearing is applicable especially when the mating material has a hardness not less than Hv 300. However, if the mating material has a lower hardness, it wears rapidly. Therefore, there is a problem that the bearing is applicable to only a few types of the mating material.

In the latter bearing, soft h-BN is used as a lubricating material, so that the bearing can exhibit the lubricating property which decreases damage of the mating material. However, if the h-BN content is not less than 5.0%, the raw material powder is poor in forming ability such that a green compact of the powder has cracking and surface creases. Thus, it is impossible to produce a bearing from the powder. From this, the h-BN content is as low as not more than 5.0%. The present inventors found that a sintered material containing not less than 5.0% h-BN has a friction coefficient further decreased, and that the wear loss of the bearing remarkably decreases especially at a high temperature of 700° C.

It is therefore an object of the present invention to establish a manufacturing method by which a bearing alloy can be easily manufactured even if the h-BN content is not less than 5.0%, and also to provide a sintered bearing alloy for high-temperature application which includes not less than 5.0% h-BN so that the excellent lubricating property of BN will be fully exhibited, and that superior sliding properties will be produced not to influence the mating material.

SUMMARY OF THE INVENTION

According to a first feature of the invention, there is provided a sintered bearing alloy for high-temperature application containing from more than 5 to 10 weight percent particles of h-BN being dispersed in the matrix of stainless steel. The h-BN particles have preferably a size of 100 to 500 μm. An article made of the bearing alloy containing the particles of h-BN having a size of 100 to 500 μm is preferably produced by mixing from more than 5 to 10 weight percent granulated h-BN powder based on the total powder forming the alloy with a blended powder which has a composition of stainless steel as a whole, forming a green compact by compressing the blended powder, and thereafter sintering it. According to another feature, the bearing alloy is produced by mixing a granulated h-BN powder with a blended powder consiting of an Fe powder and powders of other alloying elements and having a composition of stainless steel as a whole, and forming a green compact followed by sintering. More preferably, a granulated h-BN powder is mixed with a pre-alloyed powder of stainless steel. The stainless steel is preferably the austenite type.

DETAILED DESCRIPTION OF THE INVENTION

Figure 1:
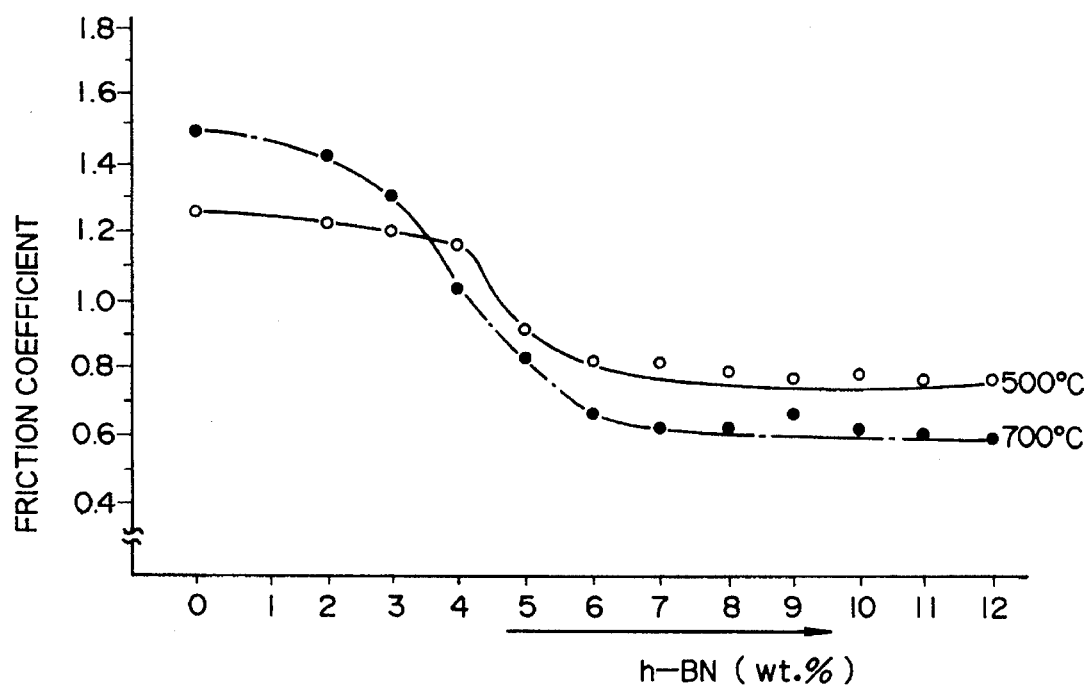
FIG. 1 is a graph illustrative of the relationship between the h-BN content and a friction coefficient.

In the sintered bearing alloy of the invention, its matrix is stainless steel because of excellent oxidation resistance at high temperature and h-BN particles being held securely in the matrix. Therefore, the invention can be applied to any kind of stainless steel. Stainless steels which have suitable hardness for the mating shaft material are selected for bearing alloys. Austenitic stainless steel is particularly preferred, because it is superior in heat resistance to other kinds of stainless steels, such as martensitic stainless steel and ferritic stainless steel.

As raw material powders for constituting stainless steel, a blended powder may be used, which consists of an Fe powder (such as a mild steel powder), and powders of Cr, Ni and other elements. Also, pre-alloyed powder of stainless steel may be used. When the blended powder material is used, the Fe powder and the other powders of alloying elements must be fully mixed to prevent segregation, especially Cr segregation, from occurring in the sintered material. With the segregated sintered material, heat resistance and mechanical strength can not properly be obtained. Consequently, by using the pre-alloyed powder of stainless steel, the alloy elements will not be segregated, thereby facilitating the powder mixing process. Therefore, the pre-alloyed powder is preferred.

When the h-BN content is not more than 5% by weight, sufficient lubrication can not be obtained. On the other hand, when the h-BN content exceeds 10%, the alloy becomes brittle, and the oxidation resistance is lowered. Therefore, the h-BN content is limited to from more than 5% up to 10% by weight. Especially when it is not less than 6%, the friction coefficient and the wear loss in a high temperature range of 500° C. to 700° C. will hardly change, so that the h-BN content is preferably 6 to 8%.

The h-BN particles exhibit excellent mechanical properties and lubricating performances when they are uniformly dispersed in the matrix. Especially, a bearing alloy having h-BN particles of about 100 to 500 μm dispersed in the matrix is preferable for facilitating the manufacture. With h-BN particles of not more than 100 μm, they are apt to segregate and can not be easily mixed uniformly in the powder mixing process. As a result, surface creases and cracking of a green compact owing to non-uniform mixing are likely to occur, thereby making favorable forming of the green compact difficult. With h-BN particles of not less than 500 μm, the alloy exhibits a kind of segregation phenomenon due to such large particles of h-BN powder, and tends to be brittle. Therefore, the diameter of h-BN particles is preferably determined so that the matrix after sintering contains h-BN particles of about 100 to 500 μm. In this invention, granulated h-BN particles may be individually separate particles or particles of compressed and mildly aggregated powder.

According to a first feature of the invention, the sintered bearing alloy contains from more than 5 to 10 weight percent of the h-BN particles, preferably having a size of 100 to 500 μm, dispersed in the matrix of stainless steel, so that there can be provided a sintered bearing alloy for high-temperature application which has an excellent lubricating property and whose influence to wear the mating material is small, at a high temperature of 500° to 700° C. The particles are dispersed in the matrix, thereby providing a bearing alloy of high toughness.

According to another feature, an article of the bearing alloy containing the h-BN particles having a size of 100 to 500 μm dispersed in the matrix, is obtained by mixing from more than 5% to 10% of a granulated h-BN powder with stainless steel powders, forming a green compact by compressing the mixture, and thereafter sintering it. Thus, the bearing alloy can be easily manufactured without causing surface creases and cracking in the green compact during compressing the alloy powder. According to still another feature, a granulated h-BN powder is mixed with a blended powder consisting of an Fe powder and powders of other alloying elements, which has a composition of stainless steel, thereby forming a green compact, so that the composition of the bearing alloy can be readily changed, and that a bearing alloy suitable for the mating shaft material and conditions such as a temperature at which the bearing alloy is used can be easily produced. According to a still further feature, a granulated h-BN powder is mixed with a pre-alloyed powder of stainless steel so as to form a green compact, and consequently, a bearing alloy having less segregation of alloying elements can be provided.

The stainless steel mentioned above is preferably the austenite type, so that a bearing alloy having superior oxidation resistance than other kinds of stainless steels can be provided.

EXAMPLE

Specimens of the present invention 1 to 9 and comparative specimens 10 to 16 will now be described.

The invention specimens 1 to 9 and the comparative specimens 10 to 16 were manufactured by powder metallurgy. As a pre-alloyed powder of stainless steel, austenitic stainless steel of JIS SUS310S (comprising, by weight, 19% Ni, 25% Cr, and the balance of Fe and unavoidable impurities) was used for invention specimens 1 to 6 and comparative specimens 10 to 16, martensitic stainless steel of JIS SUS410 (comprising, by weight, 12.5% Cr, and the balance of Fe and unavoidable impurities) was used for an invention specimen 7, and ferritic stainless steel of JIS SUS430 (comprising, by weight, 17% Cr, not more than 0.6% Ni, and the balance of Fe and unavoidable impurities) was used for an invention specimen 8, any of these stainless steels being of minus 100 mesh (not more than 150 μm). Concerning an invention specimen 9, 25% weight part of Cr powder of minus 100 mesh and 20% weight part of Ni powder and 55% weight part of a structural carbon steel powder of JIS S45C (comprising, by weight, 0.45% C, 0.25% Si, 0.75% Mn, not more than 0.03% P, not more than 0.035% S) having a particle size of minus 100 mesh.

Also, h-BN powder having an average particle size of 10 μm was compressed into a green compact and pulverized. The resultant granulated particles made of aggregated powder were used. Thus, h-BN particles having a size of about 300 μm uniformly dispersed were produced in the matrix by sintering. As for a comparative specimen 16, raw material powder of h-BN was used without granulating it.

The above-mentioned powders and particles were mixed at compounding rates shown in Table 1, and blended powders of the invention specimens 1 to 9 and the comparative specimens 10 to 16 which had compositions shown in Table 2 were prepared. During mixing, 1% zinc stearate was added to improve the forming ability. The blended powders thus obtained were compressed into circular solid bars having a diameter of 22 mm and a length of 50 mm under a molding pressure of 6 t/cm².

TABLE 1

| Type | No. | Powder Compounding Rate (Unit: wt %) | |
|---|---|---|---|
| | | Primary Material | h-BN |
| Specimen of Invention | 1 | *SUS310S | 95 | 5 |
| | 2 | SUS310S | 94 | 6 |
| | 3 | SUS310S | 93 | 7 |
| | 4 | SUS310S | 92 | 8 |
| | 5 | SUS310S | 91 | 9 |
| | 6 | SUS310S | 90 | 10 |
| | 7 | SUS410 | 93 | 7 |
| | 8 | SUS430 | 93 | 7 |
| | 9 | **(S45C + Cr + Ni) | 93 | 7 |
| Comparative Specimen | 10 | SUS310S | 100 | 0 |
| | 11 | SUS310S | 98 | 2 |
| | 12 | SUS310S | 97 | 3 |
| | 13 | SUS310S | 96 | 4 |
| | 14 | SUS310S | 89 | 11 |
| | 15 | SUS310S | 88 | 12 |
| | 16 | SUS310S | 93 | 7 |

*SUS: Japanese Industrial Standard (JIS) of stainless steel (310S = austenite type, 410 = martensite type, 430 = ferrite type).
**S45C: JIS S45C (see the former page)

TABLE 2

| Type | No. | Composition (Unit: wt %) | | | | | | | |
|---|---|---|---|---|---|---|---|---|---|
| | | Fe | Cr | Ni | Si | C | P | Mn | BN |
| Specimen of Invention | 1 | Bal. | 22.1 | 18.2 | 0.8 | 0.01 | 0.01 | 0.14 | 5 |
| | 2 | Bal. | 21.4 | 17.6 | 0.8 | 0.01 | 0.01 | 0.13 | 6 |
| | 3 | Bal. | 21.2 | 17.4 | 0.7 | 0.01 | 0.01 | 0.13 | 7 |
| | 4 | Bal. | 21.0 | 17.2 | 0.7 | 0.01 | 0.01 | 0.13 | 8 |
| | 5 | Bal. | 20.7 | 17.0 | 0.7 | 0.01 | 0.01 | 0.13 | 9 |
| | 6 | Bal. | 20.5 | 16.8 | 0.7 | 0.01 | 0.01 | 0.13 | 10 |
| | 7 | Bal. | 12.1 | — | 1.0 | 0.15 | 0.04 | 0.97 | 7 |
| | 8 | Bal. | 16.5 | 0.6 | 0.7 | 0.12 | 0.04 | 0.97 | 7 |
| | 9 | Bal. | 21.0 | 18.0 | 0.1 | 0.21 | 0.01 | 0.35 | 7 |
| Comparative Specimen | 10 | Bal. | 22.8 | 18.7 | 0.8 | 0.01 | 0.01 | 0.14 | — |
| | 11 | Bal. | 22.3 | 18.3 | 0.8 | 0.01 | 0.01 | 0.14 | 2 |
| | 12 | Bal. | 22.1 | 18.1 | 0.8 | 0.01 | 0.01 | 0.14 | 3 |
| | 13 | Bal. | 21.9 | 18.0 | 0.8 | 0.01 | 0.01 | 0.14 | 4 |
| | 14 | Bal. | 20.3 | 16.6 | 0.7 | 0.01 | 0.01 | 0.12 | 11 |
| | 15 | Bal. | 20.1 | 16.5 | 0.7 | 0.01 | 0.01 | 0.12 | 12 |

TABLE 2-continued

| | | Composition (Unit: wt %) | | | | | | | |
|---|---|---|---|---|---|---|---|---|---|
| Type | No. | Fe | Cr | Ni | Si | C | P | Mn | BN |
| | 16 | Bal. | 21.2 | 17.4 | 0.7 | 0.01 | 0.01 | 0.13 | 7 |

In the comparative specimen 16 with the h-BN powder which had not been granulated, surface creases and cracking were apt to occur in a green compact during powder compressing resulting in that the green compact could not be reliably produced. Consequently, with the comparative specimen 16, the test was stopped without the subsequent process of sintering and so forth. In the comparative specimen 16, it seems that h-BN powder was not uniformly dispersed in the green compact, and that surface creases and cracking were likely to occur due to segregation.

The formed green compacts were heated to 500° C. for dewaxing of zinc stearate, and thereafter sintered in a gaseous atmosphere of "$H_2+N_2$" at 1150° C. for one hour. Thus, test samples having high density were obtained.

Next, test plates were formed of the invention specimens 1 to 9 and the comparative specimens 10 to 15 so as to perform tests with regard to friction coefficients and volumes of plate wear loss.

In the tests for volumes of wear loss, wear tests were conducted in which a mating pin having a diameter of 4 mm and made of JIS SUS304 (consisting of, by weight, 9.3% Ni, 19% Cr, and the balance of Fe and unavoidable impurities) having a hardness of Hv 250 was brought into sliding-contact with the surface of each specimen. The pin was reciprocated at an average speed of 1 m/min. for one hour, while a load of 2 kg was applied to the sliding pin. The tests were conducted in the atmospheric air at two temperatures of 500° C. and 700° C. The results are shown in Table 3.

TABLE 3

| | | Friction Coefficient | | Volume of Plate Wear Loss (mm³) | |
|---|---|---|---|---|---|
| Type | No. | 500° C. | 700° C. | 500° C. | 700° C. |
| Specimen | 1 | 0.93 | 0.81 | 1.33 | 0.75 |
| of | 2 | 0.81 | 0.69 | 1.21 | 0.75 |
| Invention | 3 | 0.82 | 0.63 | 1.03 | 0.81 |
| | 4 | 0.80 | 0.62 | 1.00 | 0.82 |
| | 5 | 0.79 | 0.67 | 0.99 | 0.73 |
| | 6 | 0.80 | 0.61 | 0.98 | 0.81 |
| | 7 | 0.82 | 0.62 | 1.05 | 0.83 |
| | 8 | 0.83 | 0.64 | 1.10 | 0.86 |
| | 9 | 0.87 | 0.68 | 1.35 | 0.89 |
| Comparative | 10 | 1.26 | 1.50 | 2.38 | 6.85 |
| Specimen | 11 | 1.24 | 1.43 | 2.24 | 6.41 |
| | 12 | 1.20 | 1.30 | 2.15 | 5.16 |
| | 13 | 1.15 | 1.13 | 1.83 | 3.54 |
| | 14 | 0.79 | 0.60 | 0.98 | 0.82 |
| | 15 | 0.78 | 0.59 | 0.96 | 0.81 |

Figure 2:
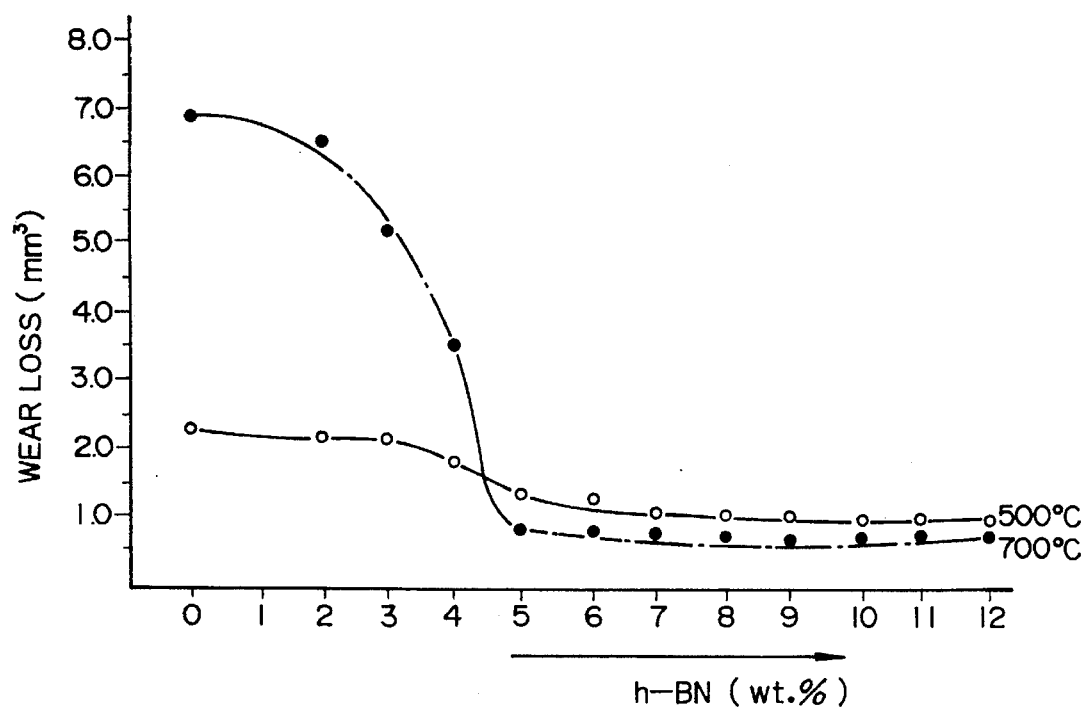
FIG. 2 is a graph illustrative of the relationship between the h-BN content and a wear loss.

The results of Table 3 are indicated in FIG. 1 concerning the friction coefficients and in FIG. 2 concerning the volume of plate wear loss. From these results, it was found that both of the friction coefficient and the volume of plate wear loss have a tendency to decrease as the mixing amount of h-BN increases. The decreasing tendencies are remarkable especially when the h-BN content is 3 to 5% by weight. When it is from more than 5% to 6%, the decreasing effects become more moderate as the h-BN content increases, and when it exceeds 6%, the friction coefficient and the volume of plate wear loss exhibit substantially constant values.

Oxidation resistance and tensile strength tests were conducted with the invention specimens 1 to 9 and the comparative specimens 10 to 15. As a result, as the h-BN content increased, the tensile strength and the oxidation resistance decreased, and when it exceeded 10 %, the specimens became brittle.

In the oxidation resistance tests, the specimens were machined to a bearing shape having an outer diameter of 16 mm, an inner diameter of 10 mm and a length of 20 mm, and were maintained in the atmospheric air at 700° C. for 100 hours. From increases in the weight, increase rates of the weights before and after heating, i.e., 100 ×((weight after heating)−(weight before heating))/(weight before heating), were derived. The results are shown in Table 4.

TABLE 4

| Type | No. | Tensile Strength (Room Temperature) N/mm² | Weight Increase Rate (%) |
|---|---|---|---|
| Specimen | 1 | 197 | 0.60 |
| of | 2 | 191 | 0.68 |
| Invention | 3 | 183 | 0.72 |
| | 4 | 181 | 0.77 |
| | 5 | 167 | 0.79 |
| | 6 | 160 | 0.98 |
| | 7 | 157 | 1.41 |
| | 8 | 161 | 1.52 |
| | 9 | 120 | 1.55 |
| Comparative | 10 | 588 | 0.20 |
| Specimen | 11 | 224 | 0.29 |
| | 12 | 210 | 0.23 |
| | 13 | 203 | 0.31 |
| | 14 | 98 | 1.79 |
| | 15 | 77 | 2.10 |

In consequence, the weight increase rates of the invention specimens 1 to 6 after 100 hours were 0.60 to 0.98, and the weight increase rates tended to increase as the additive amount of h-BN increased.

The tensile strength was 183 N/mm² in the invention specimen 3 whereas it was 157 N/mm², 161 N/mm² in the invention specimens 7, 8 and 120 N/mm² in the invention specimen 9. The invention specimen 3 which was austenitic stainless steel had the highest tensile strength. Especially in the specimen 9 with the blended powder, it seems that Cr was not uniformly dissolved in the matrix and its density was locally non-uniform so that the tensile strength was low.

What is claimed is:

1. A sintered bearing alloy for high-temperature application, wherein the matrix of said alloy is austenitic stainless steel, and from more than 5 weight percent and up to and including 10 weight percent particles of h-BN, based on the total weight of said alloy, is dispersed in the matrix, wherein the h-BN particles have particles sizes in the range of 100 to 500 μm.

2. A method of manufacturing a sintered bearing alloy for high-temperature application, comprising the steps of:

mixing from more than 5 weight percent and up to and including 10 weight percent granulated h-BN powder based on the total weight of said alloy with a stainless steel powder and thus forming a blended powder;

forming a green compact by compressing the blended powder; and sintering the green compact, whereby the sintered bearing alloy article is produced, which contains h-BN particles having particle sizes in the range of 100 to 500 μm and being dispersed in the matrix of stainless steel.

3. A manufacturing method according to claim 2, wherein the mixing step comprises adding granulated h-BN to a blended powder consisting of an Fe powder and powders of other alloying elements, and having a composition of stainless steel as a whole.

4. A manufacturing method according to claim 2, wherein the mixing step comprises adding granulated h-BN to a pre-alloyed powder of stainless steel.

5. A sintered bearing alloy according to claim 1 wherein said h-BN content is 6–8%.

6. A sintered bearing alloy in accordance with claim 1 in the form of a bearing.

7. A bearing for high temperature application formed of a sintered bearing alloy, comprising a stainless steel matrix containing at least 0.1% Si, and a solid lubricant consisting essentially of particulate h-BN in an amount from more than 5 weight % and up to and including 10 weight %, based on the total weight of said alloy, of particle sizes in the range of 100 to 500 μm, dispersed in said matrix.

\* \* \* \* \*